Dec. 26, 1933.  H. A. DOUGLAS  1,941,252
ELECTRIC SWITCH
Filed July 7, 1932
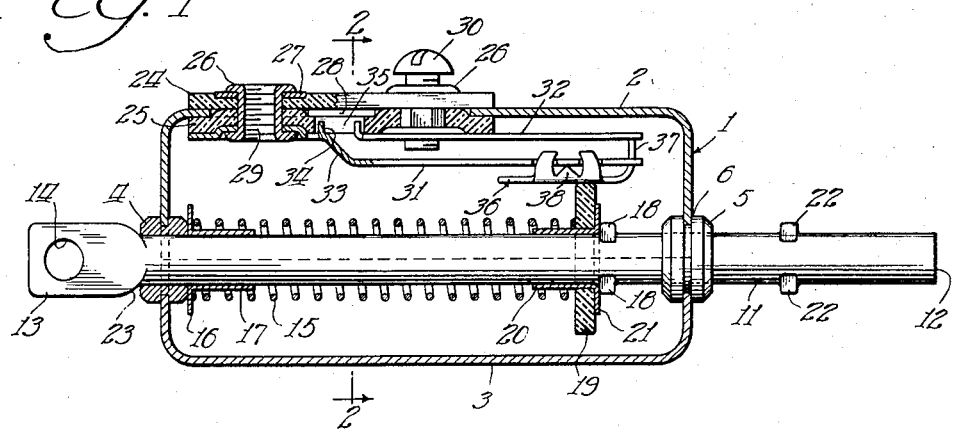
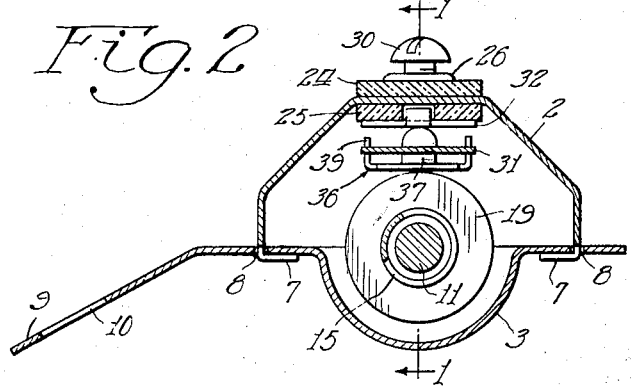
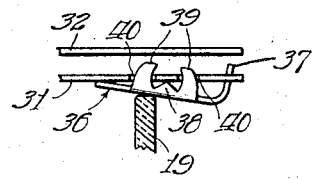
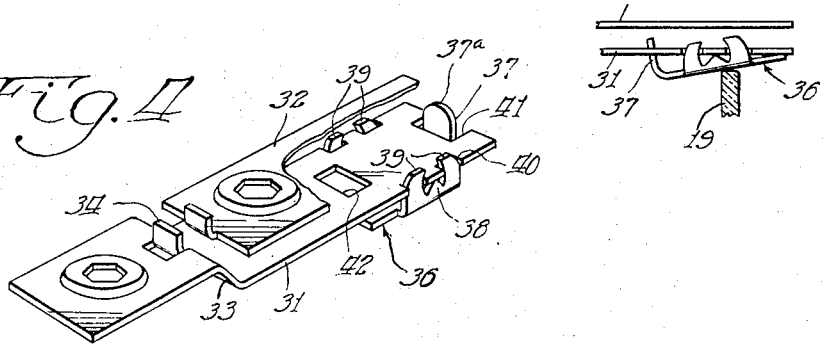
Inventor
Harry A. Douglas Patented Dec. 26, 1933

1,941,252

UNITED STATES PATENT OFFICE 1,941,252

ELECTRIC SWITCH

Harry A. Douglas, Bronson, Mich.

Application July 7, 1932. Serial No. 621,152

9 Claims. (Cl. 200—68)

This invention relates to electric switches and more particularly switches wherein reciprocable actuators are employed for effecting operation, the actuators being usually spring pressed in one direction or the other.

Switches of this type find wide employment in automatically controlled stop lights upon the rear ends of automotive vehicles, for example.

Among other objects, the invention aims to provide a positively operating switch which is at the same time highly sensitive, whereby small movements of the actuator place the switch definitely in on or off position.

The invention will be readily understood by reference to the illustrative construction shown in the accompanying drawing, in which—

Figure 1 is a longitudinal section of an exemplary switch embodying my invention, taken on the line 1—1 of Figure 2, parts being shown in elevation;

Figure 2 is a cross section taken on the line 2—2 of Figure 1;

Figure 3 is a partial section similar to Figure 1, the switching members being shown in elevation and in a different operative position;

Figure 4 is a perspective view of the switching parts of Figure 1, one of the parts being broken away for illustration; and Figure 5 is a view similar to Figure 3 but showing a modified form of switch embodying my invention.

In the illustrative construction the metallic casing 1 may be formed of two mating cup shaped sections 2 and 3 which meet in a plane passing through the axes of the bearing bushings 4 and 5. These bushings may have annular grooves therein which receive the edges of the casing sections 2 and 3 as at 6. When the casing sections are clamped together as by having the fingers 7 of one of the sections, in this instance the section 2, pass through slots 8 in the other section 3 to be thereafter bent over the section 3, the bearing bushings 4 and 5 are also clamped in position as shown in Figure 1. One of these casing sections, such as the section 3, may be laterally extended as at 9 to form a bracket by which the casing may be attached to a suitable mounting, such as the chassis of an automotive vehicle, for example. The holes 10 in the bracket extension 9 may permit the passage of clamping screws therethrough.

Reciprocable in the bearing bushings 4 and 5, I have shown the operating rod 11 which may be reciprocated in one direction either by abutment of a moving part (not shown) against its end 12 or by the pull of a moving part upon its end 13. For connection of such a pulling member (also not shown) with the rod 11 its end 13 may be advantageously flattened and punched as at 14.

Reciprocation of the rod 11 in the opposite direction is desirably accomplished by automatic means within the switch itself such as the compression coil spring 15. The coil spring 15 is shown bearing at one end against the casing 1 through the intermediation of a flange 16 of a sleeve 17 slidingly carried by the rod 11 and which is pressed by the spring 15 against the bushing 4. At its other end the spring 15 presses against an abutment on the operating rod 11, such as the diametrically disposed ears 18, which may be conveniently struck from the material of the rod 11 itself. Between this latter spring end and the abutments 18, I have shown an insulating actuator, such as the fiber disc 19. The disc 19 may be carried by the operating rod 11 through the intermediation of another metallic sleeve 20 having an annular flange 21 interposed between the disc 19 and the ears 18 on the rod. Other suitably spaced apart abutments, such as the other pair of ears 22 struck from the rod 11 and the shoulder 23 formed between the main body of the rod 11 and its flattened end 13, desirably limit movement of the rod with respect to the casing in both directions. The construction just described is disclosed and broadly claimed in the Schmid Patent No. 1,657,040, dated January 24, 1928.

Carried upon a wall of the casing 1 is a block of insulation which here comprises two fiber layers 24 and 25 clamped upon opposite sides of a wall of the section 2 by the hollow rivets 26. If desired, a washer 27 may be inserted between the head of the rivet and the fiber layers. The casing wall is cut away as at 28 in the vicinity of the rivets 26 to insulate these rivets from the casing. The rivets 26 may be tapped as at 29 to threadedly receive the conductor binding screws 30.

Carried by the insulating block formed by the fiber layers 24 and 25, I have shown two metallic contact bars 31 and 32, each of these bars being clamped to the insulating block by one of the rivets 26. In this instance, the bar 31 is bent as at 33 to be spaced from but generally parallel with the other bar 32 and with the rod 11. The bars 31 and 32 may have ears 34 struck therefrom to project into a slot 35 in the fiber layer 25 to prevent rotation of the bars upon their mountings. The bar 31 is desirably resilient and in the present case, the bar 32 is also shown of resilient construction.

In accordance with my invention, I provide a tiltable metallic switching member such as the plate 36 which is provided with a fulcrum across which the actuator 19 reciprocates, the plate 36 being supported by the contact bar 31 nearest the rod 11 and the plate having a portion which passes by the bar 31 to be brought into and out of contact with the other contact bar 32.

In the present exemplification, one end of the plate 36 is bent transversely as at 37 toward the bar 32 and the sides of the plate are bent in the same direction, but in respective planes at right angles to the end 37 and formed into triangular portions 38 at each side of the plate, these triangular portions being abreast and their apices together forming a knife edge fulcrum on the plate 36, this fulcrum bearing against the support formed by the bar 31, and the fulcrum being held to its bearing by the actuator 19. To further prevent displacement of the plate 36 the bent sides from which the triangular portions 38 are formed may be continued on each side of these triangular portions to form guide lugs 39 which are loosely received in apertures 40 in the bar 31 in this instance formed by notching the side margins of the bar. The transverse end 37 of the plate 36 may pass by the bars 31 toward the bar 32 as by having the bar 31 discontinued in the region of the transverse end 37. The bar may also be apertured adjacent this end as by having the recess 41 formed therein, in which the transverse end 37 of the plate reciprocates transversely of the bars. The transverse end 37 of the plate is desirably continued in this direction beyond the lugs 41 to suitably space the lugs at all times from the bar 32.

When the switch is in the position shown in Figure 1, which may be the normal position of the switch, the contact bars 31 and 32 are both engaged by the switching plate 36 and a circuit is closed therethrough. When the operating rod 11 is pushed or pulled upon against the force of the spring 15 to move the actuator 19 to the position shown in Figure 3, the switching plate 36 is tilted out of contact with the bar 32 and the circuit is broken. The knife edge fulcrum which I have provided effects a quick and yet positive action of the plate 36 either into or out of circuit closing position by an extremely slight movement of the actuator 19. The resiliency of the bar 31 enhances this rapidity of action of the plate 36 and furthermore the resiliency of the bar 31 particularly compensates for slight variations in the dimensions of the switch parts, while still affording positive action of the switch without the necessity of a laboriously exact dimensioning of the parts.

A modified form of my improved switch is suggested in Figure 5 where the tiltable plate 36 is shown reversed end for end, so that the plate in the normal position of the switch, as indicated in Figure 1, is out of contact with the bar 32 and the circuit thereby normally discontinued. In this modification shown in Figure 5, when the operating rod 11 is pushed or pulled upon against the force of the spring 15, the actuator 19 tilts the plate 36 into contact with the bar 32 to establish a circuit. The bar 31 may have another aperture, such as the slot 42 therein, so that the plate 36 may be supported thereon either in the position shown in Figure 3 or in the modified position shown in Figure 5, the transverse end 37 of the plate being freely movable either in the recess 41 of the bar as shown in Figure 3 or through the slot 42 as shown in Figure 5. The switch is therefore readily interchangeable for either normally on or normally off position. The transverse end 37 desirably terminates in a relative sharp edge 37a which engages the bar 32, thus effecting a good electrical contact.

Having described an embodiment of my invention, I claim:

1. As an article of manufacture, an electric switch comprising a tiltable plate; a knife-edge fulcrum on said plate; a resilient bar upon which said fulcrum bears; and an actuator reciprocable across the fulcrum substantially parallel with said bar to tilt the plate; and a resilient contact mounted apart from the support and engageable by the plate in one of its tilted positions.

2. As an article of manufacture, an electric switch comprising a tiltable plate; a pair of overlapping spaced apart contact bars; a fulcrum on said plate; a resilient support on one of said bars on its side facing away from the other bar upon which said fulcrum bears; an actuator reciprocable across the fulcrum substantially parallel with said bar to tilt the plate into engagement with the other bar; and a spring urging the actuator into one of its reciprocal positions.

3. As an article of manufacture, an electric switch comprising a tiltable plate, said plate having one end bent transversely; triangular portions at each side of the plate bent in the same direction as the end, said portions being abreast and their apices forming a knife-edge fulcrum on said plate; a support upon which said fulcrum bears, said support being apertured to permit the end of the plate to project therethrough; and an actuator reciprocable across the fulcrum to tilt the plate on its support.

4. As an article of manufacture, an electric switch comprising a tiltable plate, said plate having one end bent transversely; triangular portions at each side of the plate bent in the same direction as the end, said portions being abreast and their apices forming a knife-edge fulcrum on said plate; lugs bent from the plate on each side of said fulcrums and in the plane thereof; a support upon which said fulcrum bears, said support being apertured to permit the end of the plate and the lugs to project therethrough; and an actuator reciprocable across the fulcrum to tilt the plate on its support.

5. As an article of manufacture, an electric switch comprising a pair of substantially parallel resilient contact bars; a tiltable plate having a knife-edge fulcrum bearing on one of said bars upon its side opposite the other bar, said plate having a portion bent transversely to pass by the bar upon which it is mounted toward the other bar, said first bar being discontinued in the region of said bent portion of the plate; and an insulating actuator reciprocable across the fulcrum to tilt the plate into and out of contact with the other bar.

6. As an article of manufacture, an electric switch comprising a pair of substantially parallel resilient contact bars; a tiltable plate, said plate having one end bent transversely; triangular portions at each side of the plate bent in the same direction as the end, said portions being abreast and their apices forming a knife-edge fulcrum on said plate, said fulcrum bearing on one of said bars on its side opposite the other bar and said first bar being discontinued in the region of the bent end of the plate; and an insulating actuator reciprocable across the fulcrum to tilt the plate end into and out of contact with the other bar.

7. As an article of manufacture, an electric switch comprising a pair of substantially parallel resilient contact bars; a tiltable plate, said plate having one end bent transversely; triangular portions at each side of the plate bent in the same direction as the end but in a plane at right angles thereto, said portions being abreast and their apices forming a knife-edge fulcrum on said plate, said fulcrum bearing on one of said bars on its side opposite the other bar; a plurality of lugs bent from the plate on each side of said fulcrum and in the planes thereof respectively, said lugs extending a shorter distance from the plate than said bent end; apertures in the bar upon which the plate bears permitting the bent end and lugs to pass by the first bar toward the other bar; and an insulating actuator reciprocable across the fulcrum to tilt the plate end into and out of contact with the said other bar.

8. As an article of manufacture, an electric switch comprising a metallic casing; a block of insulation carried in the wall of the casing; a pair of substantially resilient metallic contact bars carried by the block; a tiltable metallic plate having a knife-edge fulcrum bearing on one of said bars upon its side opposite the other bar, said plate having a portion bent transversely to pass by the bar upon which it is mounted toward the other bar, said first bar being discontinued in the region of said bent portion of the plate; a rod passing through the casing parallel to the contact bars; an insulating actuator fixed on said rod and pressing on said plate; and a spring interposed between the actuator and the casing and normally pressing the actuator into position to tilt said plate into contact with said other bar.

9. As an article of manufacture, an electric switch comprising a metallic casing; a block of insulation carried in the wall of the casing; a pair of substantially resilient metallic contact bars carried by the block; a tiltable metallic plate having a knife-edge fulcrum bearing on one of said bars upon its side opposite the other bar, said plate having a portion bent transversely to pass by the bar upon which it is mounted toward the other bar, said first bar being discontinued in the region of said bent portion of the plate; a rod passing through the casing parallel to the contact bars; an insulating actuator fixed on said rod and pressing on said plate; and a spring interposed between the actuator and the casing and normally pressing the actuator into position to tilt said plate out of contact with said other bar.

HARRY A. DOUGLAS.